Patented Dec. 16, 1952

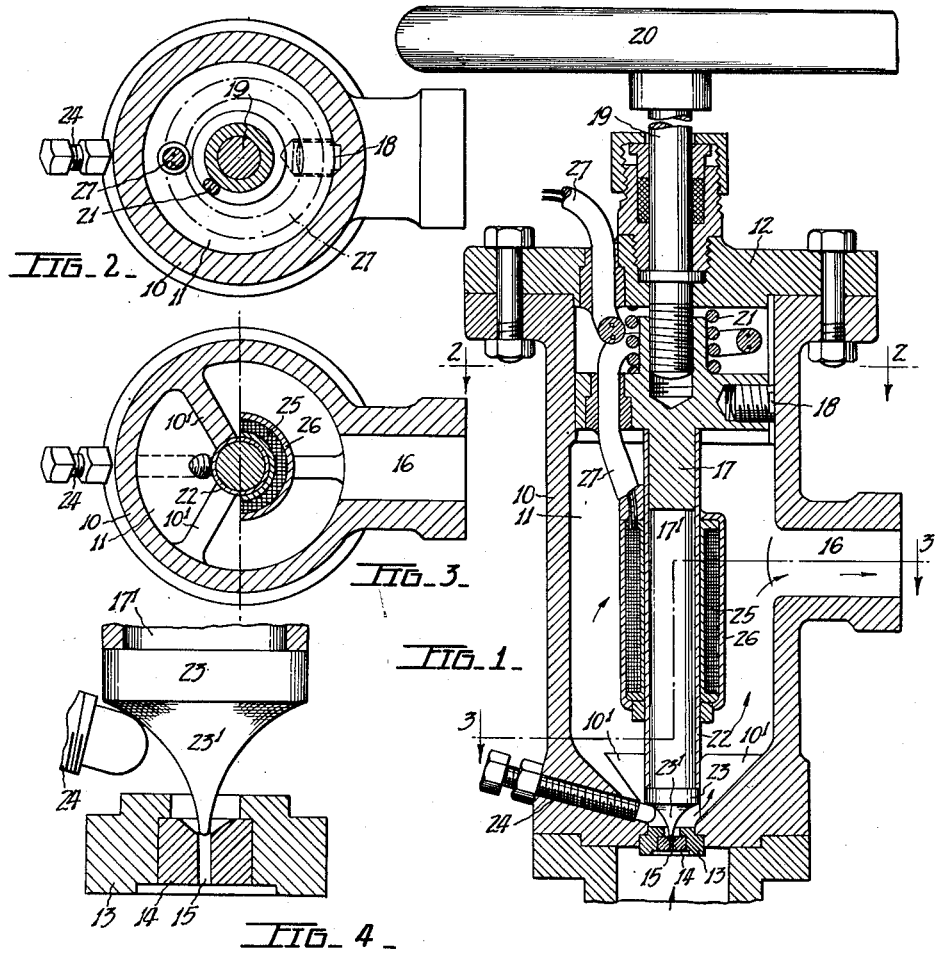

2,621,905

UNITED STATES PATENT OFFICE 2,621,905

HOMOGENIZING LIQUIDS

Francis Harold Daniell, East Malvern, Victoria, Australia, assignor to Kraft Walker Cheese Company Proprietary Limited, South Melbourne, Victoria, Australia Application March 29, 1951, Serial No. 218,114
In Australia May 22, 1950

9 Claims. (Cl. 259—27)

It is well known to homogenise liquids and semi-liquid materials by forcing same under high pressure through small orifices which commonly are formed by utilising the pressure of the liquid to displace a spring-loaded valve member from engagement with a seating therefor. This homogenising operation serves to break up or modify fat globules, micro-organic cells, such as yeast cells and other minute bodies and organisms so as to render such liquids suitable or more suitable for the formation of emulsions or for other purposes.

It is found, however, that even when very high pressures are used, such homogenising apparatus does not, in many cases, produce the desired subdivision or disruption of the globules, cells or the like, as certain of such bodies appear to pass without serious damage through orifices of smaller dimensions than said bodies themselves.

It is also known to emulsify and sterilise liquids and the like by imparting ultra-sonic vibrations thereto, such as by immersing a vibrating plate or rod in a body of the liquid. This procedure, however, does not ensure that the whole of the liquid is subjected to the desired treatment.

Now the object of this invention is to provide improvements in the homogenisation and like treatment of liquids, while one specific object is to provide a method combining advantages of the aforesaid known methods of treatment. Another object is to provide improved homogenising apparatus.

Accordingly, the method of the invention broadly comprises subjecting a liquid or a semi-liquid material to rapid vibration, while same is passing under pressure through a restricted orifice, the rate of vibration being preferably of the order of about 20,000 cycles per second or more.

A salient feature of the invention resides in imparting said vibrations to the material by rapidly varying the magnetisation of a member formed of a metal possessing magnetostrictive properties.

Thus the liquid while being subjected to the disruptive forces produced by forcing same through the small orifice is also subjected to rapid and preferably ultra-sonic vibrations, the direction of such vibrations being preferably the same as the direction of flow of the liquid.

Homogenising apparatus in accordance with the invention broadly comprises means forming a restricted orifice through which liquid may be forced under pressure, vibratory means operable to subject the liquid to vibration while same is passing through the orifice and means for imparting vibration to said vibratory means.

Said vibratory means preferably comprises an elongated member fixed at one end and formed of a metal possessing magnetostrictive properties whereby the length thereof may be rapidly varied by subjecting same to an alternating magnetic field of the desired frequency. Preferably, said vibratory member is formed of nickel or a suitable alloy which contracts when magnetised and which thus exhibits negative magnetostriction and the dimensions thereof are preferably such that its natural frequency of vibration is the same as the frequency of the alternating magnetic field.

More particularly the free end of said vibratory member is preferably reduced so as to operate as a valve in a small passage through which the liquid is forced under pressure so that the space between said reduced free end and the adjacent portions of the wall of said passage constitute the aforesaid restricted orifice.

For a more particular description of the invention, reference will be made to the accompanying drawings in which:

Figure 1 is a view in sectional elevation of a preferred form of homogenising device embodying the invention, Figure 2 is a view in sectional plan taken on the line 2—2 of Figure 1, Figure 3 is a view in sectional plan taken on the line 3—3 of Figure 2, Figure 4 is an enlarged view of portions of the device shown in Figure 1, and Figure 5 is a diagram of an oscillatory circuit.

The device shown in the drawings comprises a hollow body 10 forming a chamber 11 and provided at its upper end with a detachable cover 12.

The said chamber converges downwardly at its lower end towards a central plug 13 fitted with a hard metal insert 14 in which an axial passage 15 of small diameter is formed, such passage being flared outwardly at its upper end.

In use the liquid to be treated is forced upwardly through said passage 15 by a suitable pump (not shown) into the chamber 11 and is discharged after treatment through a lateral passage 16 formed in such chamber, such direction of flow being indicated by arrows in Figure 1.

A slidable plunger 17 fitted within the upper portion of the cylindrical chamber 11 above the discharge passage 16 has a laterally projecting key constructed by the outer end of a screw 18, such key being received within a key-way formed in the wall of the chamber, so that the plunger is restrained against angular movements.

The plunger may be moved axially by the screw-threaded inner end of an axially disposed rod 19 which extends upwardly through a sealing gland in the cover 12 and is provided at its upper end with a hand-wheel 20, such rod being restrained against axial movements.

A coiled compression spring 21 surounds the rod 19 between the plunger 17 and the cover 12 to take up the clearance space in the mating screw-threads and thus permit of the accurate location of the plunger lengthwise of the chamber 11.

The plunger is provided on its underside with an integral stud 17' which depends centrally therefrom and which is received within and forms a locating support for an axial tube 22 the lower end of which is closed by a hard metal plug 23. The lower end of this plug is reduced to form a more or less pointed tip 23' or valve member adapted to project into the flared upper end of the axial passage 15 in the fixed insert 14.

The position of said tip 23' relatively to the passage 15 may be accurately determined by an adjusting screw 24 which extends laterally through the wall of the body 10 in such position that the free inner end thereof forms a stop for the downwardly facing shoulder formed on the plug 23 at the base of the tip 23' thereon.

The tube 22 is formed of nickel or a nickel alloy possessing negative magnetostrictive properties whereby when same is magnetised its length is reduced, so that the plug 23 thereon may be screwed down tightly onto the abutment screw 24 before the tube is magnetised. If desired the said tube may be of laminated construction.

A magnetising coil 25 extends around the intermediate portion of the tube within the chamber 11, such coil being wound upon a bobbin and enclosed within a tubular casing 26, the lower end of which is secured to the tube, the said coil being preferably impregnated or covered by a layer of material which is impervious to the liquid to be treated.

The said magnetising coil is incorporated in an oscillatory circuit for which purpose it is connected by a flexible cable 27 which extends upwardly through suitably sealed holes in the plunger and cover and which preferably extends freely around the adjusting rod 19 immediately above the plunger so as not to restrict the movement of the latter.

The lower end portion of the tube 22 is guided for axial movements by the inner ends of a plurality of radial webs 10' formed integrally within the body 10 of the device.

The oscillatory circuit may be of any suitable type and may for example be of the kind shown in Figure 5, in which it will be noted that the B battery 30 as well as providing the energy for the oscillatory circuit is connected across the magnetising coil 25, so that a direct current passes continuously therethrough when the apparatus is in use, the magnitude of such current being capable of regulation by means of a plurality of tappings 25' on the coil.

This direct current through the coil ensures that the tube 22 remains at all times contracted by the magnetostrictive effect.

The constants of the oscillatory circuit are selected to provide the required range of frequencies and the length and other dimensions of the tube 22 are such that its natural period of axial vibration is within the range of frequencies of the oscillatory circuit, in order that the latter may be adjusted to the resonant frequency of the tube.

In use therefor, the tip 23' of the plug 23 on the free lower end of the vibratory tube 22 is accurately located relatively to the flared upper end of the restricted passage 15 at the bottom of the chamber 11, before the oscillatory circuit is energised, such location being effected by setting the abutment screw 24 and then screwing down the plunger 17 to the extent permitted by such screw.

The battery 30 is then connected in circuit whereby the magnetising coil 25 is energised by a pulsating unidirectional current produced by superimposing the alternating current of the oscillatory circuit on the direct current through the coil.

As previously explained the tube 22 has negative magnetostrictive properties, so that it contracts when magnetised and it will be evident that the direct current through the magnetising coil ensures that said tube is at all times magnetised and contracted when the device is in use, though the intensity of the magnetic field is varied at the frequency of the oscillatory current.

Thus the tube 22 and tip 23' carried thereby are vibrated axially by the magnetostrictive effect but the shoulder of the plug 23 remains clear of the abutment screw 24 which therefore does not interfere with the free movement of the tip.

It is to be understood, however, that the invention is not limited to the use of metals having negative magnetostrictive properties as metals exhibiting positive magnetostriction may also be employed.

The amplitude of the vibrations is, of course, very small but the frequency thereof is preferably of the order of about 25,000 cycles per second or more and as the pointed tip operates as a valve to restrict the upward flow of the liquid through the small passage 15, it will be evident that vibrations of the same frequency are imparted to the liquid flowing through said passage without materially varying the dimensions of the restricted discharge orifice constituted by the clearance space between the tip 23' and the adjacent portions of the wall of the passage 15.

That is to say the amplitude of the vibrations is not such as to produce any considerable variation in the magnitude of the disruptive forces produced by forcing the liquid through the passage 15 and around the tip 23' but the relatively high frequency vibrations transmitted to the liquid as it is passing through the passage 15 impart further disruptive forces to the constituents of the liquid in the known manner, so that the efficiency of the treatment is increased, while moreover it will be apparent that all of the liquid is subjected to such treatment.

Thus the desired degree of homogenisation may be effected using a lower pressure than would be necessary if the liquid were not simultaneously subjected to ultra-sonic vibrations, or more efficient homogenisation may be effected at the same pressure.

As the portion of the tip 23' which projects into the passage 15 is very small in diameter, the upward thrust imparted thereby to the vibration generator or tube 22 is quite small even when the liquid is under considerable pressure, so that the position of said tip may readily be adjusted in opposition to the liquid pressure, while the compressive stress in the tube is insufficient to interfere with the magnetostrictive action.

It will be understood that the invention is not limited to imparting the required vibrations to the liquid by means of a valve-like member as 23' operating in a passage as 15, because it will be evident for example that if desired the member provided with the said passage 15 may be vibrated by the magnetostrictive effect. Thus if desired the valve seat may be vibrated instead of the coacting valve.

It will be evident also that two or more of the homogenising devices herein described may be arranged in series.

I claim:

1. Apparatus for treating liquids or semi-liquid materials comprising means forming a restricted passage for the flow therethrough of the liquid or semi-liquid material, an elongated magnetostriction vibration generator arranged coaxially with said passage and disposed at the discharge side thereof, means supporting that end of said generator which is remote from said passage, valve-like means on the opposite end of said generator to coact with the discharge end of the passage and obstruct the flow of liquid therethrough and means operable to cause said generator to vibrate in the axial direction of said passage whereby vibrations are imparted to the liquid passing through said passage by said valve-like means.

2. Apparatus for treating liquids or semi-liquid materials comprising means forming a restricted passage for the flow therethrough of the liquid or semi-liquid material, an elongated magnetostriction vibration generator arranged coaxially with said passage and wholly at the discharge side thereof, means supporting that end of said generator which is remote from said passage, means operable to adjust said supporting means and generator towards and from the restricted passage, valve-like means on the opposite end of said generator to coact with the discharge end of said passage and obstruct the flow of liquid therethrough and means operable to cause said generator to vibrate in the axial direction of said passage whereby vibrations are imparted to the liquid passing through said passage by said valve-like means.

3. Apparatus for treating liquids or semi-liquid materials comprising means forming a restricted passage for the flow therethrough of the liquid or semi-liquid material, an elongated magnetostriction vibration genertor arranged coaxially with said passage and wholly at the discharge side thereof, said generator having negative magnetostriction properties, means supporting that end of said generator which is remote from said passage, means operable to adjust said supporting means and generator towards and from the restricted passage, valve-like means on the opposite end of said generator to coact with the discharge end of the passage and obstruct the flow of liquid therethrough and means operable to cause said generator to vibrate in the axial direction of said passage whereby vibrations are imparted to the liquid passing through said passage by said valve-like means.

4. Apparatus according to claim 3 including adjustable stop means arranged to limit the extent to which said valve-like means can be moved towards said restricted passage.

5. Apparatus for treating liquids and semi-liquid materials comprising means forming a passage of small cross-sectional area for the flow therethrough of the liquid or semi-liquid material, an elongated magnetostriction vibration generator arranged coaxially with said passage, means supporting said generator at that end thereof which is remote from said passage, means whereby said supporting means and generator may be moved towards and from the passage, a reduced valve member on the free end of the generator to coact with the adjacent end of the passage and obstruct the flow of liquid therethrough and a magnetising coil supported on and surrounding said generator, such magnetising coil being arranged to be connected in an oscillatory circuit.

6. Apparatus for treating liquids and semi-liquid materials comprising means forming a restricted passage for the flow of liquid therethrough, an elongated magnetostriction vibration generator arranged coaxially with said passage, means supporting the generator at the end thereof remote from said restricted passage, a reduced valve member on the free end of said generator to coact with the adjacent end of the passage and obstruct the flow of liquid therethrough, a magnetising coil surrounding said generator and means for simultaneously passing a direct and an oscillatory current therethrough.

7. Apparatus for treating liquids comprising a hollow body having a restricted passage communicating therewith, and elongated vibration generator arranged coaxially with said passage within the body, means supporting that end of the elongated member which is remote from said passage, valve-like means on the opposite free end of the elongated member to coact with the adjacent inner end of said passage and obstruct the flow of liquid therethrough, said body being formed with a further liquid passage which communicates with the interior thereof at a position spaced from said restricted passage, said elongated member being formed of magnetostrictive metal and means for subjecting same to a variable magnetic field whereby same is caused to vibrate longitudinally at a relatively high frequency.

8. Apparatus for treating liquids comprising a hollow body having a restricted passage communicating axially therewith, an elongated tubular member arranged coaxially with said passage within the body, a plunger slidable axially in said body and supporting that end of the elongated member which is remote from said passage, means for adjusting said plunger axially within the body, valve like means on the opposite free end of the elongated tubular member to coact with the adjacent inner end of said passage and obstruct the flow of liquid therethrough and a further liquid passage communicating with the interior of said body at a position spaced from said restricted passage, said elongated member being formed of magnetostrictive metal and means for subjecting same to a variable magnetic field whereby same is caused to vibrate longitudinally at a relatively high frequency.

9. Apparatus according to claim 8 including guide means for the free end portion of said elongated member.

FRANCIS HAROLD DANIELL.

REFERENCES CITED

The following references are of record in the file of this patent:

UNITED STATES PATENTS

| Number | Name | Date |
|---|---|---|
| 1,131,368 | Grelck | Mar. 9, 1915 |
| 1,441,966 | Christie | Jan. 9, 1923 |
| 2,115,056 | Wynn | Apr. 26, 1938 |
| 2,124,580 | Lavine | July 26, 1938 |
| 2,251,959 | Smith | Aug. 12, 1941 |
| 2,397,281 | MacEwing | Mar. 26, 1946 |
| 2,498,737 | Holden | Feb. 28, 1950 |

FOREIGN PATENTS

| Number | Country | Date |
|---|---|---|
| 589,999 | Great Britain | July 4, 1947 |